(12) United States Patent
Gagliano et al.

(10) Patent No.: US 11,346,067 B2
(45) Date of Patent: May 31, 2022

(54) APPARATUS FACILITATING FORMATION OF A VERTICAL OYSTER REEF AND SHORELINE REHABILITATION WITH INDUCED OYSTER REEF BARRIER AND LAGOON IMPLEMENTING THE SAME

(71) Applicant: Coastal Environments, Incorporated, Baton Rouge, LA (US)

(72) Inventors: Sherwood M Gagliano, Baton Rouge, LA (US); Mark H Gagliano, Baton Rouge, LA (US)

( * ) Notice: Subject to any disclaimer, the term of this patent is extended or adjusted under 35 U.S.C. 154(b) by 1314 days.

(21) Appl. No.: 15/351,807

(22) Filed: Nov. 15, 2016

(65) Prior Publication Data
US 2017/0055502 A1 Mar. 2, 2017

Related U.S. Application Data

(63) Continuation of application No. PCT/US2015/031148, filed on May 15, 2015.
(Continued)

(51) Int. Cl.
*E02B 3/04* (2006.01)
*A01K 61/54* (2017.01)
*A01K 61/70* (2017.01)

(52) U.S. Cl.
CPC .............. *E02B 3/046* (2013.01); *A01K 61/54* (2017.01); *A01K 61/70* (2017.01); *Y02A 40/81* (2018.01)

(58) Field of Classification Search
USPC ...... 119/221, 234–244, 200, 215; 405/15–35
See application file for complete search history.

(56) References Cited

U.S. PATENT DOCUMENTS 1,146,229 A 7/1915 Adamson
2,319,170 A 5/1943 Toner
(Continued)

FOREIGN PATENT DOCUMENTS

KR 20040849 2/2006
WO WO/2015/175975 11/2015

OTHER PUBLICATIONS

Coastal Restoration at Work, Coastal Alabama Restoration, The Nature Conservancy, MS/AL Living Shoreline Workshop [retrieved from internet Jun. 24, 2019 http://www.oyster-restoration.org/wp-content/uploads/2012/06/Slide-1-Jeff-DeQuattro-TNC-Breakwater-Project.pdf] 22 pages, Jun. 2012.*
(Continued)

*Primary Examiner* — Andrea M Valenti
(74) *Attorney, Agent, or Firm* — Blynn L. Shideler; Krisanne Shideler; BLK Law Group (57) ABSTRACT

A shoreline restoration method utilizes a plurality of apparatuses facilitating the formation of a vertical oyster reef. Each apparatus includes a rod frame and a plurality of individual mesh bags are positioned between an inner and an outer frame. The inner and outer frames include top and bottom frame portions and a plurality of side support frame members extending there between. Each individual mesh bag is aligned with at least one outer side support frame member and at least one inner side support frame member and wherein each individual mesh bag is coupled to an adjacent mesh bag. A plurality of cross ties extends between the inner frame and the outer frame and cultch material fills each individual mesh. The shoreline restoration method promotes shell accumulation and expands the tidal zone.

18 Claims, 5 Drawing Sheets

Related U.S. Application Data (60) Provisional application No. 61/993,471, filed on May 15, 2014.

(56) References Cited

U.S. PATENT DOCUMENTS

| | | | |
|---|---|---|---|
| 3,294,061 A | | 12/1966 | Hanks |
| 3,316,881 A | | 5/1967 | Fischer |
| 3,430,607 A | | 3/1969 | Derouen |
| 3,702,599 A | | 11/1972 | Herolzer |
| 3,779,209 A | | 12/1973 | Budge et al. |
| 3,811,411 A | | 5/1974 | Moeller |
| 3,985,101 A | | 10/1976 | Thompson |
| 3,996,894 A | * | 12/1976 | Wiegardt, Jr. .......... A01K 61/54 |
| | | | 119/237 |
| 4,182,270 A | | 1/1980 | Fourcher |
| 4,186,687 A | | 2/1980 | Gilpatric |
| 4,317,429 A | | 3/1982 | Leighton et al. |
| 4,377,987 A | | 3/1983 | Satre |
| 4,710,057 A | | 12/1987 | Laier |
| 4,788,937 A | | 12/1988 | Keyser |
| 4,913,094 A | * | 4/1990 | Jones ..................... A01K 61/70 |
| | | | 119/221 |
| 4,947,791 A | | 8/1990 | Laier et al. |
| 5,269,254 A | * | 12/1993 | Gagliano ............... A01K 61/54 |
| | | | 119/237 |
| 5,803,660 A | * | 9/1998 | Warren ..................... F01B 1/12 |
| | | | 119/221 |
| 5,924,820 A | | 7/1999 | Creter |
| 6,024,050 A | | 2/2000 | Rheault |
| 6,464,429 B2 | | 10/2002 | Moore |
| 6,565,283 B1 | * | 5/2003 | Hall ......................... E02B 3/046 |
| | | | 405/21 |
| 6,824,327 B1 | | 11/2004 | Walter |
| 6,830,411 B1 | | 12/2004 | Amari |
| 7,144,196 B1 | | 12/2006 | Campbell et al. |
| RE42,259 E | | 3/2011 | Campbell et al. |
| 8,020,516 B2 | | 9/2011 | Labra Reynolds |
| 8,291,863 B2 | | 10/2012 | Krone et al. |
| 8,550,033 B2 | | 10/2013 | Matthews et al. |
| 2003/0077122 A1 | | 4/2003 | Carnahan et al. |
| 2003/0094141 A1 | | 5/2003 | Davis |
| 2003/0136349 A1 | | 7/2003 | Hall |
| 2009/0194217 A1 | | 8/2009 | Filbert |
| 2014/0193199 A1 | | 7/2014 | Farrell, Jr. |
| 2014/0270961 A1 | | 9/2014 | Farrell, Jr. |

OTHER PUBLICATIONS

Evaluating the Shoreline Protection Function of Three Divergent Constructed Oyster Reef Structures in Terrebonne Bay Louisiana, Glen Curole and Dr. Melancon, 3rd Biennial State Coast Conference, [internet Jun. 24, 2019 http://coastal.la.gov/wp-content/uploads/2014/05/Curole_SOC_LivingShorelines.pdf] Mar. 2014; 26p.*

State of Louisiana Coastal Protection and Restoration Authority of Louisiana (CPRA) Terrebonne Bay Shore Protection Demonstration (TE-45) [retrieved from internet Jun. 24, 2019 https://www.lacoast.gov/reports/project/TE45_2015_OM_M_Report_FINAL.pdf] 2015; 151 pgs.*

Louisiana CPRA, Living Shoreline Demonstration Project, Data Collection Summary and New Data Collection Plan Technical Memorandum [retrieved from internet Jun. 24, 2019 ftp://ftp.coastal.la.gov/PO-0148/20130125%20-%20LSDP%20Data%20Collection%20FINAL%20Technical%20Memo%20r1%20red.pdf] Jan. 2013, 52 pages.*

Oyster Reef Project Spurs Innovation and Community Cohesion in Alabama, by Jeff DeQuattro, The Nature Conservancy, Nov. 30, 2011, 17 pages [retrieved from internet Dec. 3, 2019; http://conservationgateway.org/Documents/7_%20Alabama_ARRA_CERF_2011.pdf].*

Aerial view of ReefBLK breakwater and EcoSystems wave attenuators; Deadman's Island, by Mar R. Byrnes, Sep. 28, 2011, 3 pages, [retrieved from internet Dec. 3, 2019; https://www.researchgate.net/figure/Aerial-view-of-ReefBLK-breakwater-and-EcoSystems-wave-attenuators-placed-to-the-north-and_fig3_261980438].*

* cited by examiner

APPARATUS FACILITATING FORMATION OF A VERTICAL OYSTER REEF AND SHORELINE REHABILITATION WITH INDUCED OYSTER REEF BARRIER AND LAGOON IMPLEMENTING THE SAME

RELATED APPLICATIONS

This application is a continuation of International Patent Application Serial Number PCT/US15/31148 filed May 15, 2015 and which published on Nov. 19, 2015 as WO2015-175,975, which publication is incorporated herein by reference. International Patent Application Serial Number PCT/US15/31148 claims priority to U.S. patent application Ser. No. 61/993,471 filed May 15, 2014, entitled "Apparatus Facilitating Formation of a Vertical Oyster Reef" which application is incorporated herein by reference in its entirety.

BACKGROUND INFORMATION

1. Field of the Invention

The present invention relates to apparatus and associated method for facilitating the formation of a vertical oyster reef and methods for shoreline rehabilitation with induced vertical oyster reef and lagoon.

2. Background Information

The Eastern Oyster (*Crassostrea virginica*), which is also called the American Oyster, Atlantic Oyster, Common Oyster, and Virginia Oyster, is native to the southeastern United States and lives in estuaries and marine coastal environments. The first stage in an oyster's life cycle is the free-swimming larval stage. After about three weeks, the larva attaches to a hard substrate such as prop roots, dock pilings, natural rock, and other oysters becoming an oyster spat, oysters that have just settled to the bottom. A large number of oysters often join together, thus forming an oyster reef, which is also referred to as oyster bed or oyster mat. Once attached to a surface, oysters will stay there for the remainder of their lives.

Oyster beds are an incredibly important resource for marine habitat and ecosystems. They provide a number of ecological, economical and recreational benefits to the environment and our lives. The Eastern Oyster acts as a "keystone species" by filtering estuaries and maintaining healthy, coastal ecosystems. It has been estimated (see www.nature.org) that almost 95% of the seafood consumed in the United States spends a portion of its life in these estuaries. In addition, oyster reef also provide structured habitat in the form of refuge and hard substrate for a whole community of organisms.

Without the oysters to solidify the benthic structure of the ecosystem, cascading impacts could cause large-scale transformations of oyster reef habits into unproductive shifting soft bottoms. This would result in significant changes in diversity and abundance of endemic marine species that were depending on the oyster reefs.

Oyster reefs are able to survive in a wide range of reasonable salinity and temperature levels. Furthermore, oyster beds are efficient in filtering phytoplankton, pollutants, and suspended sediment from the water column. They consume nitrogen-containing compounds, and remove them from water. Oysters also limit the amount of phytoplankton in the water and improved water quality and other marine life. The oyster beds reduced competition and dissolved oxygen, and on average, it has been estimated that they filter about a gallon and a half of water per hour.

Oyster beds further dissipate wave energy, acting as a breakwater, stabilize bottom sediments and reduce erosion. Further, oyster reef improved the water quality, which increased recreation conditions for swimming, boating, surfing and sport fishing. In addition to being a keystone species, oysters also serve as an indicator species in that they are used to gather information on the overall health of the ecosystem.

The majority of oyster populations have greatly declined within the last century due to over-harvesting, dredging, increased sedimentation, invasive species, pollution and disease. Preliminary field surveys revealed that native oysters are regularly reproducing and recruiting to local populations, but suitable settlement habitat in the form of a suitable oyster bed is lacking. In response to this decline, many oyster restoration projects have been put into place throughout the southeastern United States. The projects develop a long-term strategy of sustained productivity for oyster reefs and restore the ecological role they provide to nearby reef habitats.

The Nature Conservancy states that oyster restoration is crucial to creating a balanced, healthy ecosystem by being a beneficial nursery for various juvenile marine species, filtering impurities in the water, as well as preventing coastline erosion. Additionally, such restoration will contribute to better water flow patterns within estuaries. It is surprising and insightful to note that the oyster capital of the world was once New York City, where carts selling oysters were as common as hot dog stands are today. As a consequence of this substantial change, there have been oyster reef restoration projects conducted in New York City for the last several years and there is currently a plan to create 500 acres of oyster reefs (originally by 2015) and then 5,000 by 2050.

The first step in oyster restoration is to determine the locations for potential reefs. Traditionally this is often done by comprehensive surveys that measure salinity levels, water quality, previous existence of oyster reefs, substrate conditions, prevalence of diseases, tidal range, oxygen concentration, algae concentration, prevalence of predators, accessibility and security. Traditionally once the location is determined, cultch (which is typically fossilized shell, coral or other similar materials produced by living organisms designed to provide points of attachment for oysters) is often obtained from sustainable recycling programs. Used oyster and clam shells from farmers and restaurants are sometimes collected (and disinfected) to be used in oyster restoration. Once returned to the water, these recycled shells provide substrate for oyster larval eggs to begin populating oyster beds. A variety of materials have be utilized to form the cultch.

Commonly in the southeastern U.S., mangroves and other shoreline vegetation are often planted in conjunction with oyster restoration efforts to provide substrate surface area to attach to and reduce shoreline erosion, resulting in less sediment deposits within estuaries. Oyster restoration in public waters often requires permits and licenses from various agencies with requirements varying from state to state. Most often permits typically involve the U.S. Army Corps of Engineers, state natural resource agencies and state public health departments. The National Oceanic and Atmospheric Administration (NOAA) provides some of the major goals of an oyster restoration project: Augment commercial harvest, Serve as habitat, Improve water quality, Increase or improve spat set in an area by creating oyster sanctuaries, Maintain or increase biodiversity, Restore ecological function, Provide a barrier to prevent beach or shoreline erosion, and Protect and enhance sea grass restoration projects.

The following are some specific examples in the southeastern United States. Florida began "The Oyster Reef Restoration" project in June 2009 and the project is funded by the National Oceanic and Atmospheric Administration (NOAA) as part of the American Recovery and Reinvestment Act of 2009. The goal of the project is to restore the important oyster habitat in the St. Lucie and Loxahatchee Estuaries, two of the largest brackish water systems on the east coast of Florida, where over the last 50 years oyster populations have declined by as much as 75%.

In Georgia the "Generating Enhanced Oyster Reefs in Georgia's Inshore Areas (G.E.O.R.G.I.A.)" is a volunteer-based program with the goal of enhancing stewardship and public awareness of oyster reef habitat along the Georgia coast, where previous oyster beds are essentially non-existent. The program recycles oyster shells from local seafood restaurants to use as cultch in new oyster reefs. Volunteers of the oyster reef building and monitoring are trained by the Marine Extension Service and building takes place every spring.

In South Carolina the "South Carolina Oyster Restoration and Enhancement (SCORE)" is another volunteer oyster restoration movement. SCORE operates under the direction of the South Carolina Department of Natural Resources (SCDNR) and began in May 2001. The sites span approximately 200 miles (320 km) of the South Carolina coastline and have constructed 188 oyster reefs at 35 sites since the program began.

In North Carolina, the Eastern Oyster populations of the Tar-Pamlico and Neuse River basins have plunged 97% to 3% of historic numbers throughout the last century. In response to this drastic change, the Citizens' Oyster Gardening Project (COGP) began. COGP is an environmental demonstration project that encourages oyster gardening aimed to reestablish populations of native Eastern Oysters in North Carolina through education and aquaculture methods. Educational workshops teach volunteers how to measure water quality and give information on oyster gardening techniques as well as necessary tools and materials, as they have asserted that advocacy through networking by volunteers is key to COGP's success.

Oyster beds have suffered a large-scale depletion along the coast of Southern California. The EPA, Orange County Coast keeper and California Coastal Commission recognized that a large scale habitat restoration of oyster beds represented the primary means of improving degraded marine ecosystems. Long Beach Management Group has been asked to assist in designing an oyster restoration project along the Orange County coast by utilizing public-private investments. The EPA authorized the disbursement of funds to the Long Beach Management Group for the Alamitos Bay Native Oyster Restoration Project. The restoration of oyster beds in Orange County was hypothesized to have major positive effects on the resilience, biodiversity, and function of estuarine ecosystems. The long term goal was to protect and preserve all of Southern California's water bodies and restore them to healthy, fully functioning systems that would protect recreational uses and aquatic life.

In oyster bed reconstructions a vertical oyster reef represents an oyster bed construction, or reconstruction, which extends vertically from the sea bed. In addition to oyster habitat development, the vertical oyster reef allows for efficient erosion control and rapid sediment accumulation. Additionally the vertical implementation provides a habitat for other aquatic life. These "ancillary" benefits to the vertical oyster reef sometimes become the driving force in the implementation of the vertical oyster reef, with the traditional oyster reef benefits becoming "ancillary".

The patent literature has also described solutions to the restoration of oyster beds and to related materials. The applicant's prior work represents a key effective tool in this effort and is disclosed in U.S. Pat. No. 5,269,254, which is incorporated herein by reference, and discloses a method for forming an vertical oyster reef, includes setting seed oysters on cultch material, placing the cultch material containing the seed oysters in water permeable panels to form a vertical permeable wall of cultch material through which water may flow, and placing the panels in water having favorable conditions for oyster growth. The apparatus includes water permeable panels for holding cultch material in a vertical permeable wall to expose the entire column or wall of cultch to water having favorable conditions for oyster growth, and blocks formed from the panels.

U.S. Pat. No. 6,024,050, which is incorporated herein by reference, discloses a shellfish aquaculture "upweller" system utilizes one or more upwellers having a volume-defining silo, a selectively removable exhaust port and a selectively removable and liquid permeable assembly.

U.S. Pat. No. 6,464,429, which is incorporated herein by reference, discloses an artificial reef module for coral reef remediation which includes a central body having an upper settling plate, a middle settling plate, and a lower settling plate. Extending from the central body is a plurality of primary tines which further include a plurality of secondary tines extending from them. The primary tines include the supporting tines, the stabilizing tines, and the space filling tines. The branching of the tines allegedly closely replicates the appearance of natural branching coral. Over time the individual artificial reef modules for coral reef remediation would slowly degrade and allow the tines to break off. This degradation allegedly closely approximates the fragmentation that occurs with natural branching coral.

U.S. Pat. RE42,259 (originally U.S. Pat. No. 7,144,196), which is incorporated herein by reference, discloses an apparatus and method of reducing the effects of hydrodynamic forces of waves and water currents in coastal environments (e.g., oceans, and coastal, river, lake, and reservoir banks). The apparatus is an "oysterbreak" having two basic designs adapted to allow for the attachment of oysters and other "bio-fouling marine organisms", using the least amount of material. In one embodiment, the oysterbreak comprises a support structure and plurality of slats (i.e., relatively planar sections or surfaces) having growth layers made from tubing coated with a material capable of inducing aquatic sessile organism attachment and growth. In another embodiment, the oysterbreak comprises a plurality (e.g., two, three, four, five, six, etc.) of growth layers of regular polygonal-shaped members made from a material capable of inducing aquatic sessile organism attachment and growth that when stacked, form a relatively portable, breakwater module.

U.S. Pat. No. 8,020,516, which is incorporated herein by reference, discloses a device and method for the sea-based culture of sea urchins and abalones includes two parallel lateral elements, where each one of their ends has a groove and a hole for the installation of four braces. The center areas of the braces have a plurality of parallel and equidistant guides for the installation of a plurality of vertically inserted plates, forming spaces between the plates that permit housing sea urchins or abalones on both faces of such plates. At the bottom of the device a horizontal tray holds algae for feeding sea urchins and the abalones; wherein, both the plurality of plates and the tray are enclosed in an elongated mesh, wherein the ends of the mesh are joined to the ends of the lateral walls of the tray, such that the length of the mesh wraps around the plurality of plates.

U.S. Pat. No. 8,291,863, which is incorporated herein by reference, discloses a transportable device for colonizing and harvesting invertebrate animals in proximity to a floor of a body of water includes at least two quadrangular frames, each of which include a trapping surface. A central hinge is disposed between opposing, inner traverse sides of the at least two quadrangular frames and has a first one-way folding direction.

U.S. Pat. No. 8,550,033, which is incorporated herein by reference, discloses a method for establishing a clam bed includes raising clam larvae in a captive environment in which they are provided with adequate food and habitat requirements, and kept isolated from predation by natural predators. The clam larvae are maintained in this environment during the first larval stage, referred to as the trochophore stage of development, when the larvae are particularly vulnerable to mortality. During the next stage of development, the developing larval clams are released, preferably in large numbers (saturation spawning) at any time during the veliger stage of development, i.e., the generic stage following the trochophore larval stage, and which includes the sub-stages of straight-hinge veliger, umbonate veliger, and pediveliger. Preferably, the entire process prior to release in accordance with the invention is carried out in a closed system, to significantly reduce possible exposure to contaminants and/or harmful predator larvae/parasites, in addition to larger animal predators.

Korean Patent Publication 20040849 discloses a "domed oyster shell" in which "a plurality of the lower frame is connected to the installation" to "form the infrastructure of the polygon to be seated on the sea floor.", inside the "lower structure has a plurality of inner frames of the lower frame" and "a plurality of outer frame is provided obliquely so as to connect the upper end of the lower frame" and the vertical frame forms a generally truncated dome wherein the top oyster shell storage body is provided in the plurality of skeleton frame connection to form a polyhedron having a predetermined height. The peripheral portions has a metal mesh installed to prevent the oyster shell is leakage.

Additionally U.S. Pat. Nos. 5,924,820, 6,824,327, 6,830,411, 4,947,791, 4,788,937, 4,710,057, 4,377,987, 4,317,429, 4,186,687, 4,182,270, 3,985,101, 3,811,411, 3,779,209, 3,702,599, 3,430,607, 3,316,881, 3,294,061, 2,319,170, and 1,146,229 and U.S. Patent Publications 2014-0270961, 2014-0193199, 2009-0194217, 2003-0136349, 2003-0094141, and 2003-0077122 are also of general interest and are incorporated herein by reference.

It is one object of the present invention to provide oyster bed restoration efforts with better, efficient, cost effective, easy to implement apparatus and associated methods for facilitating the formation of a vertical oyster reef. It is one object of the present invention to provide methods for shoreline rehabilitation with induced vertical oyster reefs.

SUMMARY OF THE INVENTION

This invention is directed to a cost effective, efficient, and easy to implement apparatus and associated methods for facilitating the formation of a vertical oyster reef. This invention is also directed to cost effective, efficient methods for shoreline rehabilitation utilizing induced vertical oyster reefs and associated lagoons.

One embodiment of the present invention provides an apparatus facilitating the formation of a vertical oyster reef comprising: a frame formed of rod members and including an inner frame and a radial outwardly spaced outer frame, the inner frame including an inner top frame portion and a vertically spaced inner bottom frame portion, the outer frame including an outer top frame portion and a vertically spaced outer bottom frame portion, a plurality of outer side support frame members extending between the outer top frame portion and the outer bottom frame portion, a plurality of inner side support frame members extending between the inner top frame portion and the inner bottom frame portion, and a plurality of cross ties extending between the inner frame and the outer frame; a plurality of individual mesh bags are positioned between the inner frame and the outer frame, wherein each individual mesh bag is aligned with at least one outer side support frame member and at least one inner side support frame member and wherein each individual mesh bag is coupled to an adjacent mesh bag; and cultch material fills each individual mesh bag.

A system facilitating the formation of a vertical oyster reef according to one aspect of the invention includes a configuration of three triangular units, wherein each triangular unit has one corner attached to a corner of another triangular unit and a second corner attached to a corner of the remaining triangular unit.

One aspect of the present invention provides a method of shoreline rehabilitation with induced oyster reef barrier and lagoon comprising the step of installing at least two segments of contiguous vertical oyster inducing elements, wherein each segment is formed of contiguous line of a plurality of apparatus designed to induce the formation of vertical oyster reefs, wherein each segment is placed at least 25 ft from an original shoreline, and wherein each segment extends at least 60 ft laterally along the shoreline, and wherein each segment is laterally spaced from an adjacent segment by a distance sufficient to form a tidal pass and to stimulate the formation of a tidal lagoon associated with the tidal pass, to stimulate the accumulation of shell shore side of each segment and on the original shoreline and inland of the original shoreline. The shoreline restoration method promotes shell accumulation and expands the tidal zone, yielding shoreline rehabilitation and habitat restoration as well as providing recreational and commercial opportunities consistent with a sustainable natural environment.

These and other aspects of the present invention will be clarified in the description of the preferred embodiment of the present invention described below in connection with the attached figures in which like reference numerals represent like elements throughout.

BRIEF DESCRIPTION OF THE PREFERRED EMBODIMENTS

This invention is directed to a cost effective, efficient, apparatus 10 facilitating the formation of a vertical oyster reef.

Figure 1:
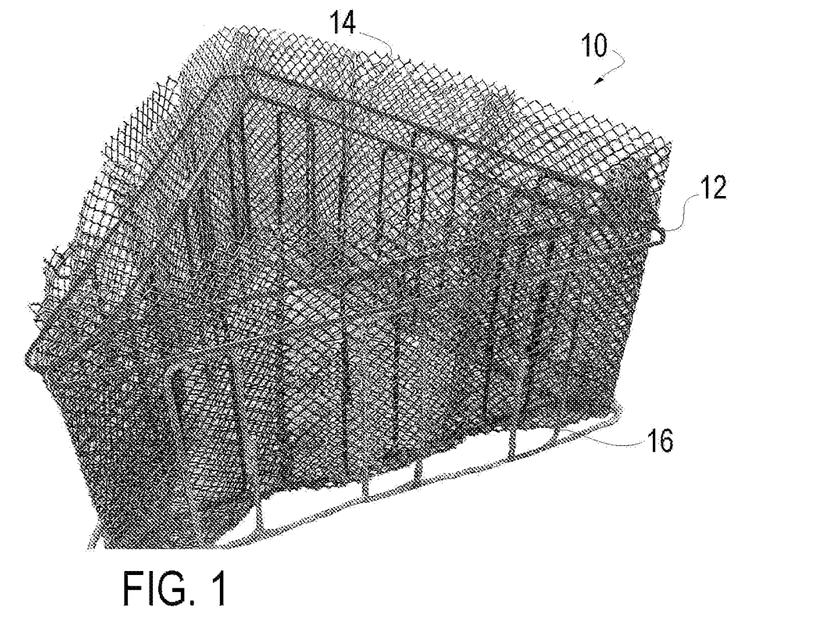
FIG. 1 is a perspective view of an apparatus facilitating the formation of a vertical oyster reef in accordance with one embodiment of the present invention.

The present invention provides an apparatus 10 facilitating the formation of a vertical oyster reef comprising: a frame 12 formed of rod members and including an inner frame 14 and a radial outwardly spaced outer frame 16 forming a double frame structure which is an important aspect of the present design. This double layer of support via the inner frame 14 and the outer frame 16 is crucial for the structural support of the apparatus 10 and the application of the apparatus 10 in areas subject to wave energy and strong currents.

Figure 2A:
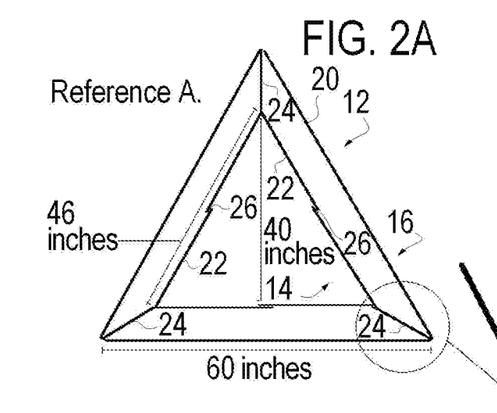
FIG. 2A is a schematic plan view of an end frame portion forming the apparatus facilitating the formation of a vertical oyster reef of FIG. 1.

FIG. 2A is a schematic plan view of an end frame portion of frame 12 forming the apparatus 10 facilitating the formation of a vertical oyster reef of FIG. 1. The end frame portion of frame 12 shown in FIG. 2A forms the top frame portion at the upper end of the apparatus 10 and the bottom or lower frame portion and the lower end of the apparatus 10. The end frame portions of the top frame portion and the bottom or lower frame portion are the same shape and substantially the same size. It is possible the upper frame portion is formed slightly smaller than the bottom frame portion to provide a small taper or pitch to the apparatus 10, if desired for increased stability. Adding pitch to the apparatus does not change the fundamental construction or operation of the apparatus 10.

As noted above the frame 12 is formed of rod members which is preferably steel rods, rebar, of at least ⅜" diameter (imperial bar size #3 Metric "soft" size #10), generally ⅜" to ¾" (imperial bar size #6 Metric "soft" size #19) steel bars, with ½" (imperial bar size #4 Metric "soft" size #13) and ⅝" (imperial bar size #5 Metric "soft" size #16) being preferred for frame 12. Rebar (short for reinforcing bar), also known as reinforcing steel and reinforcement steel, is historically a common steel bar often used as a tension device in reinforced concrete and reinforced masonry structures, to strengthen and hold the concrete in compression. The surface of the rebar has often been patterned generally to form a better bond with the concrete, although it also provides advantages in welding.

Common rebar is made of unfinished tempered steel and is commonly available, cost effective, relatively easy to work with (in this context of the frame 12 the "easy to work with means relatively easy to bend to shape and weld together) and suitable for the environment. Weldable rebar can also be utilized (rebar with a lower carbon equivalent and higher tensile strength). Preferably steel rebar of at least ½" thickness are preferred for forming the frame 12. Uncoated, corrosion-resistant low carbon/chromium (microcomposite), epoxy-coated, galvanized or stainless steel rebar and even fiber-reinforced plastic rebar, or plastic or composite rods may be employed to form the frame 12 at greater initial expense, however the cost advantages and availability and ease of use of common ½", ⅝" or greater rebar for forming the frame 12 with suitable strength and wear characteristics may be difficult to overcome.

As shown in FIG. 2A the end frame portions of the inner frame 14 and the outer frame 12 are triangular in plan or top view. Other polygonal shapes are possible as are circles, ovals, ellipses, and even irregular shapes such as a crescent shape, semicircular, "S" shapes and the like. The equilateral triangular shape of the frame 12 in plan view as shown provides a modular configuration for the apparatus 10 that allows the a plurality of the apparatuses 10 to be easily implemented into larger reef constructions, while still providing for acute angled wave breaking apexes that can be positioned to face, and to better withstand, wave energy. One modular configuration of note for the equilateral triangle shape for frame 12 as shown is the use of three apparatuses 10 that are coupled together in a larger equilateral triangle (i.e. two apparatus 10 form the base and one apparatus 10 forms the apex) with each side having twice the length of each individual apparatus 10 side length. The rebar frame 12 also allows for easy connection of adjacent apparatus 10.

Figure 2B:
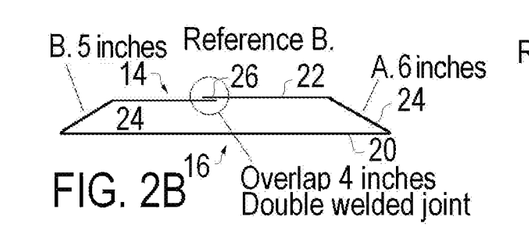
FIG. 2B is a schematic plan view of a portion of the end frame portion of FIG. 2A.

As shown in FIG. 2A the end frame portions of the inner frame 14 and the outer frame 12 may be easily formed by forming three generally trapezoidal members shown in FIG. 2B. Specifically, a single piece of rod member, such as ⅝" rebar, is bent to form the outer side 20 of the outer frame 16 and the inner side 22 of the inner frame 14 and a pair of cross ties 24 extending between the outer side 20 and the inner side 22. Thus on each side of the end portion of the frame 12 the common sides 20 and 22 of the inner end (top or bottom) frame portion and the outer (top or bottom) frame portion are formed from a one piece rod structure, and whereby each one piece rod structure also forms the two cross ties 24.

Each one piece rod structure has a coupled overlapping rod section along side 22 for forming coupling weld 26. A double weld of about 4" is sufficient for the frame 12 as shown. The double weld references a welding on both sides of the overlapping rods. A double weld is particularly helpful for improving strength and durability of the apparatus 10 in environments experiencing the repeating flexing due to wave energy. In order to reduce the stress on the portions of the inside side 22, the cross ties 24 are of slightly different lengths, of about 6" and 5" respectively so that the overlapped portions of the rod at the weld 26 can be more easily maintained as parallel. For clarification, if the cross ties 24 were the same length then additional bends would be required to have a parallel overlapping portion. Having each cross tie 24 of the pair of the cross ties 24 of each one piece rod structure of a different length as shown provides a simple method for allowing the overlapping rod sections at double weld 26 to remain plumb. In alternative embodiments the side 20 or even the cross ties 24 could be formed with the overlap and the double weld 26 without significantly changing the construction of the apparatus 10.

Figure 2C:
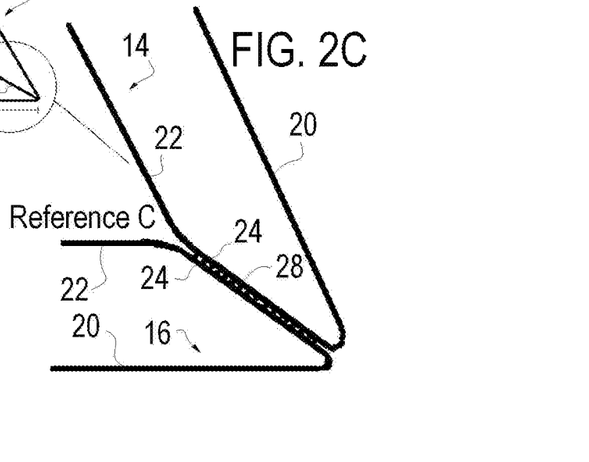
FIG. 2C is an enlarged schematic plan view of a portion of the end frame portion of FIG. 2A.

The three trapezoidal elements of FIG. 2B are welded together at welds 28 along adjacent cross ties 24, as shown in detail in FIG. 2C, to form the structure of the end portion of frame 12 shown in FIG. 2A. The welds 28 are also preferably double welds as well.

Figure 3A:
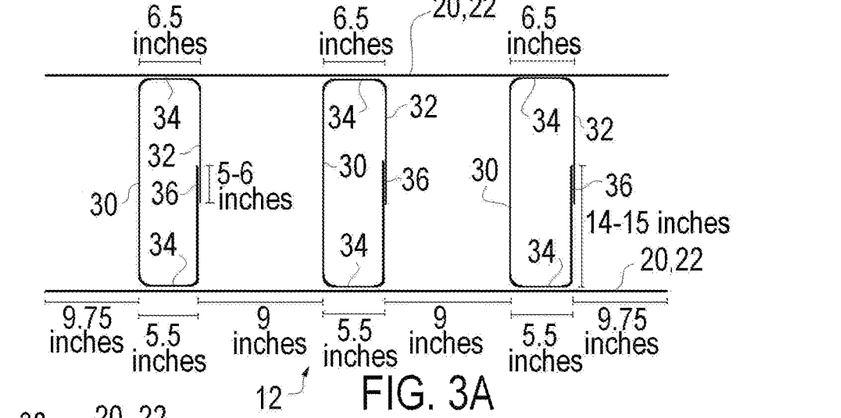
FIG. 3A is a schematic elevation view of a side frame portion forming the apparatus facilitating the formation of a vertical oyster reef of FIG. 1.
Figure 3B:
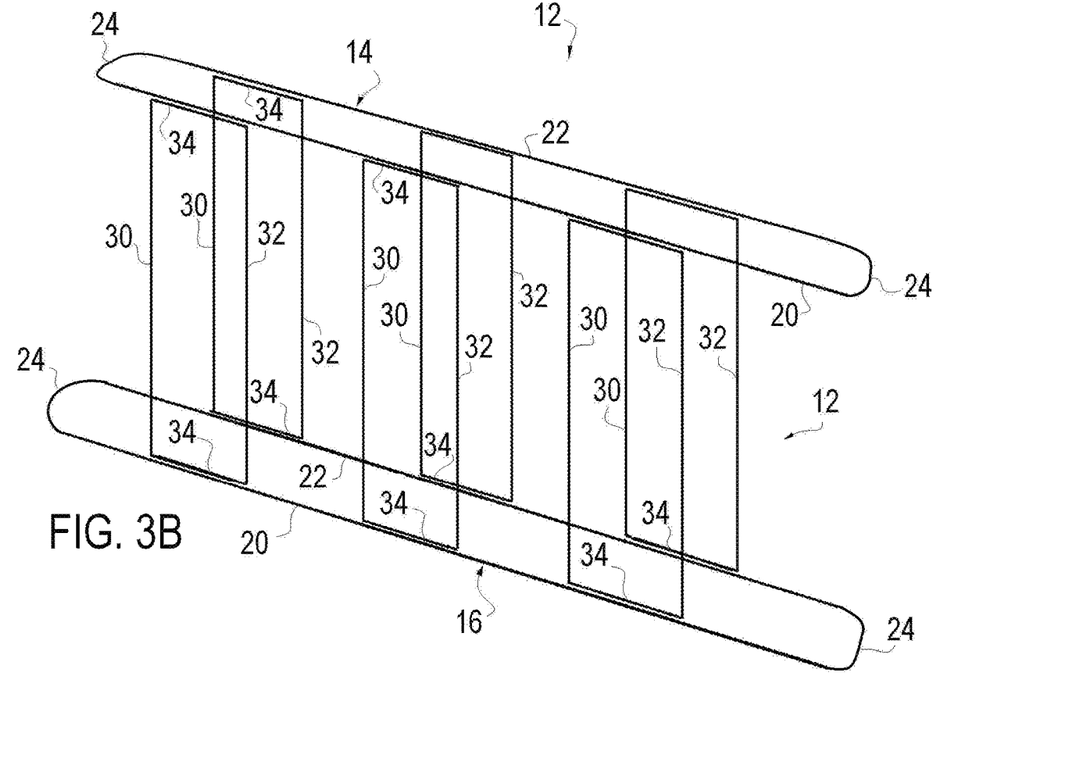
FIG. 3B is a schematic perspective view of an inner and outer side frame portion forming the apparatus facilitating the formation of a vertical oyster reef of FIG. 1.
Figure 3C:
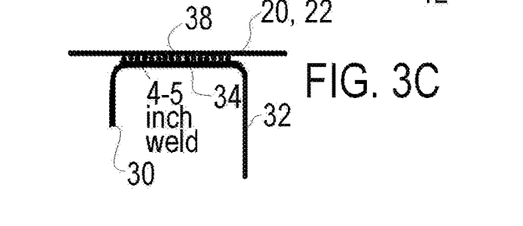
FIG. 3C is an enlarged schematic elevation view of the side frame portion of FIG. 3A.
Figure 4A:
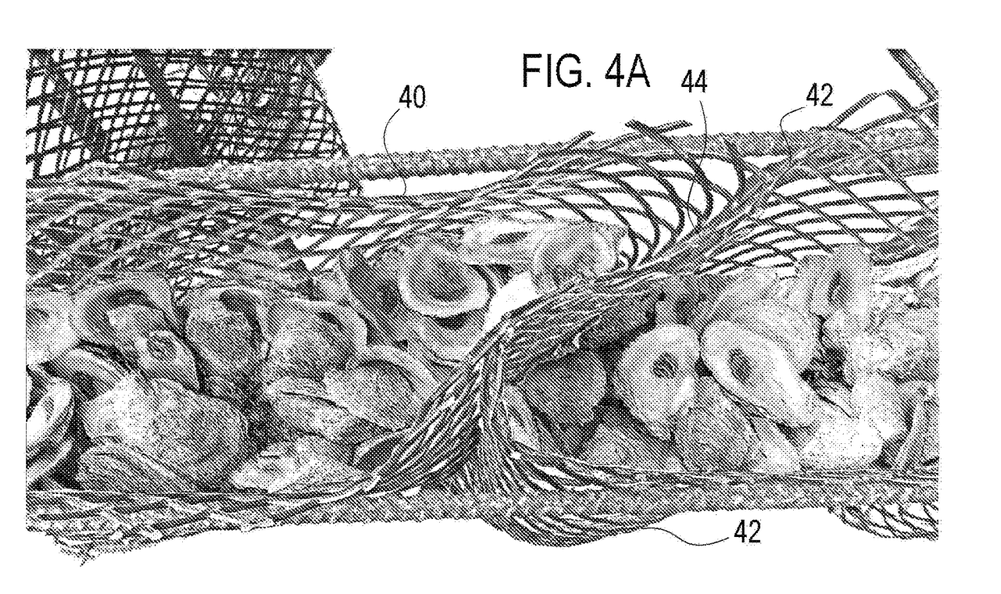
FIG. 4A is a top perspective view of a portion of the apparatus facilitating the formation of a vertical oyster reef of Figured 1.
Figure 4B:
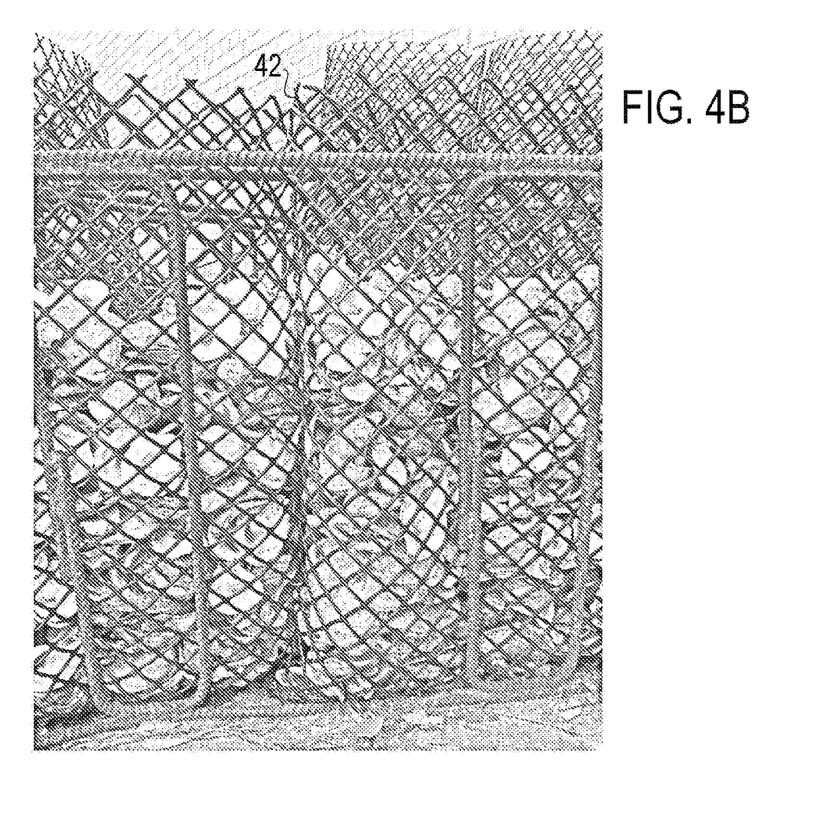
FIG. 4B is a side perspective view of a portion of the apparatus facilitating the formation of a vertical oyster reef of Figured 1.
Figure 4C:
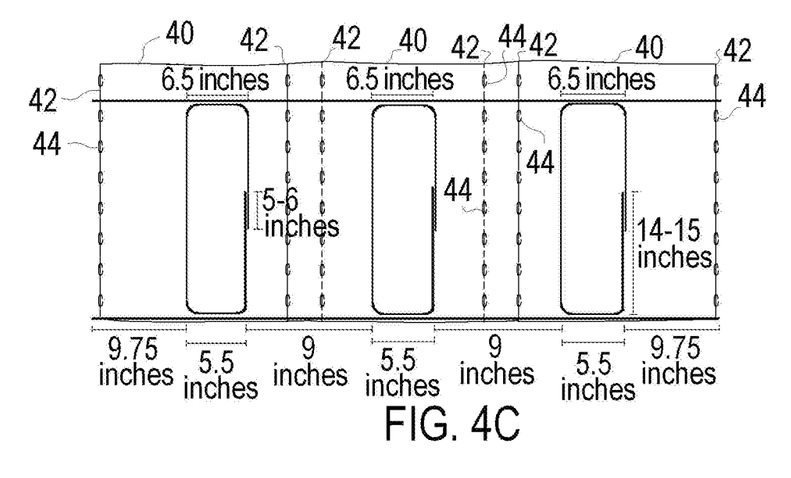
FIG. 4C is a schematic elevation view of a side portion forming the apparatus facilitating the formation of a vertical oyster reef of FIG. 1.

The inner frame 14 and the outer frame 16 include three side support frame members extending between the top frame portion and bottom frame portion formed by end ports shown in FIG. 2A. Any number of side support members may be utilized, but the three rectangular side support members as shown is particularly cost effective as it allows one side support member to be associated with one bag 40 as discussed below. Further, it is efficient and effective if the side support members of the inner frame 14 generally align with the side support members of the outer frame 16 as best shown in FIG. 3B.

Each side support frame member as shown is formed from a one piece side support rod structure, preferably a ½" or ⅝" rebar, which is formed as a generally rectangular structure having a pair of vertical members 30 and 32 extending between leg members 34 coupled to the side 20 or 22 of the top frame portion and to the side 20 or 22 of the bottom frame portion, respectively. Each one piece side support rod structure has a coupled overlapping rod section of 5-6" on side 32 for accommodating weld 36. The leg members 34 are preferably welded to the side 20 or 22 via weld 38. The welds 36 and 38 are preferably a double weld for the reasons discussed above in connection with other welds 26 and 28. The legs 34 are preferably vertically aligned with the side 20 or 22 of the top frame portion and the side 20 or 22 of the bottom frame portion to allow for the double weld 38. The double weld 38 may be more critical than the other double welds in maintaining the structural integrity of the apparatus due to the forces exerted and the length of the side support frame members.

The side support frame member can take a large number of configurations without departing from the intended operation of the same. For example a Z shape with a single side member 30 "diagonally" between two leg members 34, a trapezoid, a C shape with a single member 30 between two leg members 34, an I shape with a single member 30 between two leg members 34, an X shape in which the sides 30 and 32 are crossed, and a host of other possibilities. The rectangular shape as shown is efficient and simple to manufacture and assemble. Further the rectangular shape provides some hoop strength characteristics to the side support frame member.

An important aspect of the invention is providing a plurality of individual mesh bags 40 positioned between the inner frame 14 and the outer frame 16. As shown, each individual mesh bag 40 is aligned with and generally centered with at least one outer side support frame member formed by sides 30 and 32 and at least one inner side support frame member formed by sides 30 and 32 of a generally aligned side member. The bags 40 are preferably formed of a mesh opening size and material commonly used in oyster cultivation and a material that can withstand the environmental conditions. Typically the bags will be plastic material having mesh openings of about 1¼". There are some studies directed to optimizing the mesh openings for oyster reef construction and in material selection that promulgates oyster production, thus other mesh opening sizes are possible and other materials or growth inducing surface treatments is contemplated.

The apparatus 10 includes nine (9) individually manufactured plastic bags 40 each with a mesh opening size of 1 and ¼ inch. Each individual bag 40 originally has a continuous cylindrical form construction with no side seam, but open on the top and bottom of the bag 40. Oval or even rectangular shaped bags 40 could be used but such specialty shapes are not likely cost effective and circular cross section bags 40 are quite effective. A seam of 14-15 individual staple style fasteners are used to "stitch" or close the bottom of each bag approximately 1.5 inches from the bottom of the bag 40. Each individual bag 40 dimensions are about 55 inch in width and about 32 inch height in the apparatus 10 as shown.

A key aspect of the present invention is that the three bags 40 for each side of the apparatus 10 are overlapped such that there are two seams 42 of staple style fasteners 44 attaching one bag 40 to the adjacent bag 40 along a common side of the apparatus 10 at the point of intersection. The fasteners 44 may be formed efficiently as stainless steel staple style fasteners with dimensions: ⅞ inch width×⅜ inch length. Many other fasteners may be easily utilized, such as zip ties.

As shown in the figures, one seam 42 (shown in phantom) formed by 16-17 staple style fasteners 44 is on the inside of the apparatus 10 and the second seam 42 also formed by 16-17 staple style fasteners 44 is on the outside of the apparatus 10. This overlapping and the use of two seams 42 per bag 40 on the side provide extra strength to each side of the apparatus 10. The overlapping of the bags 40 on the sides distributes load and force from wave action to the side of the apparatus 10. The overlapping of each bag is approximately 6"-12", generally 8"-9" depending on the alignment of each bag 40.

Additionally each bag 40 on the end of one side of the apparatus 10 is attached to the bag 40 of an adjacent side via a single seam 42 also formed by about 16-17 staple style fasteners 44. The apex at the corners allows the end bags to be coupled via a single seam 42. The corner seams 42 serve to lock the bags 40 between the inner 14 and outer frame 16 due to the cross ties 24. Thus with the described construction the apparatus 10 facilitating the formation of a vertical oyster reef provides that each individual mesh bag 40 is overlapping at least one adjacent mesh bags 40 when viewed in the directing extending from the outer side support frame members to the inner side support frame members. Further each individual mesh bag 10 is coupled to two adjacent mesh bags 40 with the center bags 40 overlapping the end bags 40, and wherein the overlapping of each individual mesh bag is about 6" to 12".

Cultch material 50 fills each individual mesh bag 40 to a point where the bag 40 is pressing against the side support members formed by sides 30 and 32 of both the inner frame 14 and the outer frame 16. Cultch material 50 is generally fossilized shell, coral, limestone rock, crushed concrete, or other similar materials produced by living organisms designed to provide points of attachment for oysters. Any desired and acceptable cultch material 50 may be used within the bags 40, although the desired cultch material 50 may alter the bag construction, such as a change in mesh size opening. "Artificial" cultch materials 50 have even been proposed such as disclosed in U.S. Pat. Nos. 3,316,881 and 4,844,015 which are incorporated herein by reference, and these may also be used, if desired, in the bags 40. The cultch material 50 may also be site specific depending upon the particular restoration/rehabilitation project being implemented.

One modification of the present invention is to form/prefabricate the end portions of the apparatus 10 wherein the vertical support pieces for the sides can be manufactured in different lengths to accommodate the desired height of a specific project. This would adjust the overall height of the apparatus 10 to a specific project as desired in an efficient manner. Further this construction allows pre-assembly of the top and bottom and easy shipping of the frame components for assembly on-site.

Structural strength of the apparatus 10 is one important key to the design of apparatus 10. The individual apparatuses 10 are each designed to handle severe stress at the corners and the joints where the vertical supports of the frame 12 intersect the top and bottom components. This reinforcement is accomplished though a double wall design or double frame design as described. The double weld construction is also important for strength and preventing frame failure. Field testing of prior unit frames assembled with single sided welds to attach top and bottom components resulted in higher number of failures than the disclosed design of apparatus 10. The overlapping of the bags 40 on each side also substantially reduced failure rates.

The trapezoidal top and bottom design allow for an open bottom of the framework. It was determined through extensive field testing of the units that a closed or supported bottom would chafe. A "supported bottom" is formed by placing a cross tie under the bag 40. This closed or supported construction results in movement, associated with wave action, of the plastic bags 40 that hold the cultch material 50 against such a bottom support resulting in failure along the bottom seam of the bag 40. This ultimately resulted in a loss of cultch material 50 in the plastic bags 40. Designing the framework to allow for structural connection only at the corners of the bottom component of the frame (and the top) allowed for the bottom of the assembly 10 to remain open and not to interfere with the bags 40. In testing the engagement of the side supports do not have a detrimental effect on the bags 40 in the apparatus 10.

This invention is also directed to cost effective, efficient methods for shoreline rehabilitation utilizing induced vertical oyster reefs and associated lagoons from designated placement of apparatus 10 that facilitate the growth of vertical oyster reefs, particularly when grouped into configurations 70 and aligned in contiguous segments 80 with intervening tidal pass 84 to form lagoons 74 under natural processes. This application builds upon, and is designed to increase the effectiveness of earlier oyster reef restoration concepts. The goal is to sustain and rehabilitate the initial shore line 72 by reducing locally generated wave energy impinging on relatively sheltered shorelines.

Figure 5:
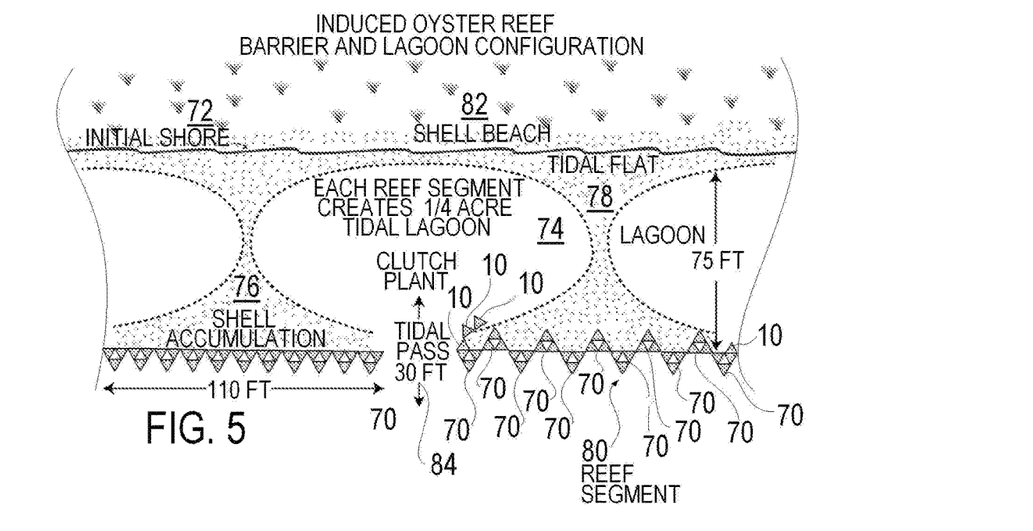
FIG. 5 is a schematic plan view of a method for shoreline rehabilitation utilizing induced vertical oyster reefs and associated lagoons in accordance with the present invention.

The shoreline rehabilitation concept illustrated in FIG. 5 was designed for the marshes and is designed to preserve the geologic framework of subsided, relict river distributary channel-levee features in the marshes through the restoration of extensive oyster reefs, comparable to those that historically existed. The design incorporates at least two segments 80 of contiguous vertical oyster inducing elements, namely apparatuses 10 formed generally in configurations 70. As shown each segment may have alternative designs for the apparatuses 10, including a line of apparatuses 10 along the tidal pass to protect the lagoon from scowling.

The grouping of configurations 70 is believed to represent an effective and efficient construction and the majority of the segment is preferably these structures. Note that one segment 80 has these elements in alternating directions while the other segment 80 orientates the configuration so the apex is directed seaward for wave dissipation. These two designs are illustrated to represent that a wide infinite variety of designs are possible. For example the segments 80 may be bowed relative to shore line 72 so that the middle is farther than the ends adjacent the tidal pass 84. The segments 80 may follow contour or sea-floor elevation lines as well. There are a number of variations that are possible.

Each segment 80 is formed of contiguous line of a plurality of apparatus 10 designed to induce the formation of vertical oyster reefs. The term contiguous means the lateral distance (the distance parallel to the shoreline) between adjacent oyster reef forming elements or apparatus 10 is less than ⅔ of the lateral distance of each reef forming element 10, preferably less than ½ of this distance, and most preferably the apparatus 10 are positioned such that there is no lateral distance between adjacent apparatuses 10 as shown. The adjacent elements 10 may be coupled together in any conventional fashion to add further stability to the system.

Each segment 80 of contiguous vertical oyster inducing elements or apparatuses 10 is placed a distance from the initial shore 70 sufficient to form a desired lagoon 74, generally at least 25 ft. However 50 to 100 feet will be more typical for the placement of the segment 80 from the shore 70, with 75 ft in FIG. 5 being quite effective.

Each segment 80 of contiguous vertical oyster inducing elements or apparatuses 10 extends a sufficient distance to promote the formation of a desired lagoon 74, and promote shell accumulation 76 leeward of the segment 80 and promote the tidal flat 78. The length of the segments will generally be at least 60 ft, preferably at least 75 ft. As shown, 110 ft segments 80 positioned 75 ft from shore 72 with a 30 ft wide tidal pass 84 between segments 80 has shown to produce an approximately ¼ acre tidal lagoon 74 through natural processes.

As noted above each segment 80 is laterally spaced from an adjacent segment 80 by at designed distance forming a tidal pass 84 sufficient to form a lagoon 74 via natural processes. The tidal pass 84 is preferably at least 8 feet allowing for a small boat to navigate without interfering with the apparatus 10 forming the segments 80. Preferably the tidal pass is at least 15 ft and more preferably at least 25 ft. As shown in FIG. 5, a 30 ft tidal pass 84 was desirable for formation of the ¼ acre lagoon 74.

Figure 6:
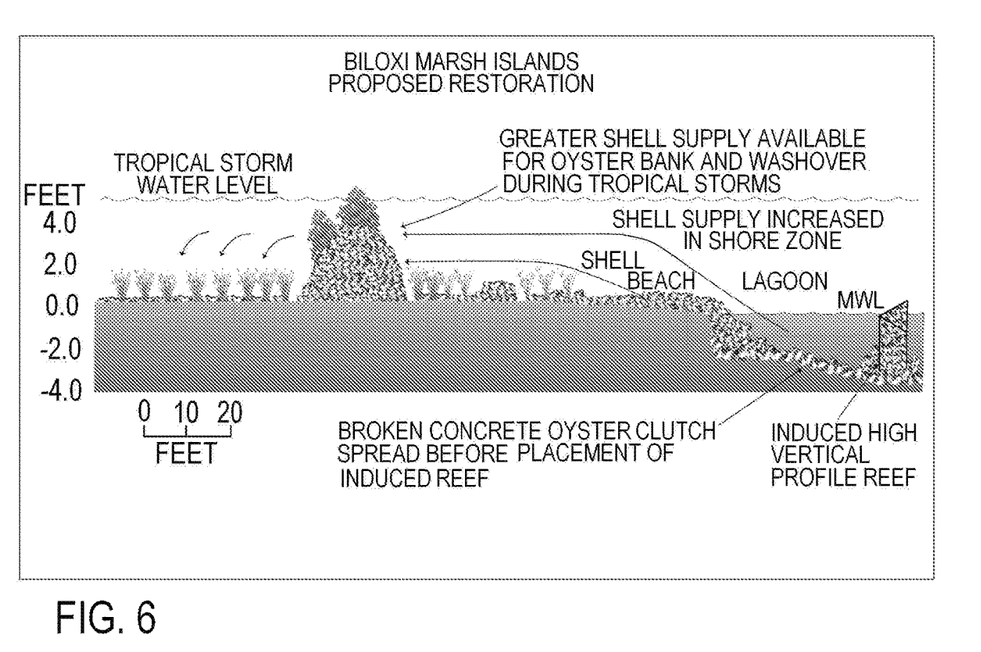
FIG. 6 is a schematic cross section across an oyster zone marsh illustrating the shoreline restoration and stabilization aspects and processes.

The tidal pass 84 and segments 80 stimulate the formation of a tidal lagoon 74 and stimulate the accumulation of shell at 76 behind each segment 80 and on the original shoreline 72 as a new shell beach 82 and even inland of the original shoreline 72 as demonstrated in FIG. 6. The method and system shown in FIG. 5 both creates a protective zone of greater width and biological productivity that will more quickly generate greater volumes of shell to armor the shore at shell beach 82. The segments 80 become natural "shell factories" acting under natural processes.

One application of the method and system of the present invention is the Biloxi Marshes of Louisiana which are among the oldest and currently healthiest still extant marshes along the Louisiana coast because they are not subject to the rapid subsidence that characterizes most other areas of the deltaic plain. Marsh loss in the Biloxi Marshes continues, however, as a consequence of edge erosion by waves, the rate of which is proportional to wave energy exposure, itself a function of the fetch, or the distance over which wind blows across open water to build waves. This technique of a bioengineered defense in depth (a wide zone consisting of seaward reef, protected tidal lagoons and shell armored shoreline) is designed to offset a reduction in supply of the oyster shell that once armored these intricate shorelines and accumulated in shell banks and spits that are the core of many marsh islands. Increasing the supply of shell and calcareous sand derived from shell using artificial reefs can be a critical component of a strategic stabilization plan for bioengineered reef zones. The additional reef segments 80 or modules generate shell and create protected low-energy lagoon habitat as guided by wave modeling, shore face slope and bottom properties. This currently proposed technique offers the potential to further reduce the rate of shoreline retreat by using a bioengineered "defense in depth."

The reef structures of segments 80 facilitate oyster recruitment on the structures formed generally by configurations 70 of three elements 10, as well as propagation and dispersal of oyster larvae that contribute significantly to local and area habitat enhancement and oyster productivity. Oyster reefs have been shown to increase biological productivity and biodiversity, carbon sequestration and improving water quality. Studies have shown that the growth rate of oysters on unharvested vertical reefs far exceeds the rate of predicted sea-level rise; thus enabling the reefs to provide natural protection against shoreline erosion and loss/degradation of intertidal habitat. Once in place, the system yields ecosystem restoration and hurricane protection and, generally, a sustainable coast.

The opportunity to restore a zone of highly productive oyster-dominated near-shore lagoonal habitat is also valuable. The system described effectively expands the tidal zone from a small two-four foot section near shoreline 72 to an expanded area which includes the lagoon 74 and the tidal pass 84. This can be an extremely useful area for recreational and commercial purposes as it is a desirable intertidal habitat.

The lagoon 76 may further include additional components or aspects so as to accentuate one use or purpose. For example the lagoon 72 may include a supplemental oyster grow out facility such as apparatus 10 (alone or grouped together) which would be modified for simplified harvest. The tidal pass 84 may be designed to best accommodate such use in terms of flow into and out of the lagoon 74. An alternative additional component for lagoon 74 which amplifies the utility of the habitat created is the inclusion of a supplemental fish grow out facility. The provision of a supplemental fish grow out facility may include designing the tidal pass to increase or control the flow of water to facilitate the growth of designated fish in the lagoon 74.

The oyster-dominated near-shore lagoonal habitat of FIG. 5 are optimal locations for bird rookeries. The system creates shell accumulation that function a sea bird nesting/rookeries (the well drained shell base prevents rotting of the egg shell, and the heat retention of the shell is conducive for egg incubation and hatching) but further adding fresh water repositories within the habitat facilitates the inclusion and support of migratory neo-tropical birds such wood warblers, thrushes. Supplemental additions for bird rookeries may include the adding of scrub vegetation for suitable habitat inland of the shore line.

The oyster-dominated near-shore lagoonal habitat of FIG. 5 may be further engineered through the inclusion of additional plants and environmental elements for attraction of a specific marine life. For example adding submerged aquatic vegetation in the lagoon may be suitable for designated fin fish and shell fish such as shrimp and crabs.

It is apparent that many variations to the present invention may be made without departing from the spirit and scope of the invention. The present invention is defined by the appended claims and equivalents thereto.

What is claimed is:

1. A method of shoreline rehabilitation with induced oyster reef barrier and lagoon comprising the steps of:
installing at least two segments of contiguous vertical oyster inducing elements, wherein each segment is formed of contiguous line of a plurality of apparatus designed to induce the formation of vertical oyster reefs, wherein each segment is placed substantially the same distance from an original shoreline, wherein the distance from the original shoreline is at least 25 ft from the original shoreline, and wherein each segment extends at least 60 ft laterally along the shoreline, and
forming a tidal pass by placing each segment laterally spaced from an adjacent segment by a distance sufficient to form a tidal pass of at least 15 ft and each segment is laterally spaced from an adjacent segment by a distance no greater than ½ of the length of either adjacent segment, and whereby the tidal pass and the two segments of contiguous vertical oyster inducing elements combine to stimulate the formation of a tidal lagoon associated with the tidal pass through the accumulation of shell at least partly shore side of each segment.

2. The method according to claim 1 wherein at least one apparatus designed to induce the formation of vertical oyster reefs includes a frame formed of rod members and including an inner frame and a radial outwardly spaced outer frame, the inner frame including an inner top frame portion and a vertically spaced inner bottom frame portion, the outer frame including an outer top frame portion and a vertically spaced outer bottom frame portion, a plurality of outer side support frame members extending between the outer top frame portion and the outer bottom frame portion, a plurality of inner side support frame members extending between the inner top frame portion and the inner bottom frame portion, and a plurality of cross ties extending between the inner frame and the outer frame; a plurality of individual mesh bags are positioned between the inner frame and the outer frame, wherein each individual mesh bag is aligned with at least one outer side support frame member and at least one inner side support frame member and wherein each individual mesh bag is coupled to an adjacent mesh bag; and cultch material fills each individual mesh bag.

3. The method according to claim 1 wherein each segment of contiguous vertical oyster inducing elements includes a plurality of configurations of three triangular elements, wherein each triangular element within each configuration has one corner attached to a corner of another triangular element and a second corner attached to a corner of the remaining triangular element.

4. The method according to claim 1 wherein the lagoon includes one of a supplemental oyster grow out facility, or a supplemental fish grow out facility.

5. The method according to claim 1 further including the planting of additional plants and environmental elements for attraction of a specific marine or aviary life.

6. The method according to claim 1 wherein each segment is placed 50 to 100 feet from the original shoreline.

7. The method according to claim 6 wherein each segment is laterally spaced from an adjacent segment by a distance of 15 ft to 30 ft to form the tidal pass.

8. The method according to claim 7 wherein each segment of contiguous vertical oyster inducing elements includes a plurality of configurations of three triangular elements, wherein each triangular element within each configuration has one corner attached to a corner of another triangular element and a second corner attached to a corner of the remaining triangular element.

9. The method according to claim 8 wherein at least one apparatus designed to induce the formation of vertical oyster reefs includes a frame formed of rod members and including an inner frame and a radial outwardly spaced outer frame, the inner frame including an inner top frame portion and a vertically spaced inner bottom frame portion, the outer frame including an outer top frame portion and a vertically spaced outer bottom frame portion, a plurality of outer side support frame members extending between the outer top frame portion and the outer bottom frame portion, a plurality of inner side support frame members extending between the inner top frame portion and the inner bottom frame portion, and a plurality of cross ties extending between the inner frame and the outer frame; a plurality of individual mesh bags are positioned between the inner frame and the outer frame, wherein each individual mesh bag is aligned with at least one outer side support frame member and at least one inner side support frame member and wherein each individual mesh bag is coupled to an adjacent mesh bag; and cultch material fills each individual mesh bag.

10. A method of shoreline rehabilitation with induced oyster reef barrier and lagoon comprising the steps of:
installing at least two segments of contiguous vertical oyster inducing elements, wherein each segment is formed of contiguous line of a plurality of apparatus designed to induce the formation of vertical oyster reefs, wherein each segment is placed substantially the same distance from an original shoreline, wherein the distance from the original shoreline is at least 25 ft from the original shoreline, and wherein each segment extends at least 60 ft laterally along the shoreline, and wherein each segment of contiguous vertical oyster inducing elements includes a plurality of configurations of three triangular elements, wherein each triangular element within each configuration has one corner attached to a corner of another triangular element and a second corner attached to a corner of the remaining triangular element, and
forming a tidal pass by placing each segment laterally spaced from an adjacent segment by a distance sufficient to form a tidal pass of at least 15 ft and whereby the tidal pass and the two segments of contiguous vertical oyster inducing elements combine to stimulate the formation of a tidal lagoon associated with the tidal pass through the accumulation of shell at least partly shore side of each segment.

11. The method according to claim 10 wherein each segment is laterally spaced from an adjacent segment by a distance of 15 ft to 30 ft to form the tidal pass.

12. The method according to claim 11 wherein each segment is laterally spaced from an adjacent segment by a distance no greater than ½ of the length of either adjacent segment.

13. The method according to claim 12 wherein each segment is laterally spaced from an adjacent segment by a distance of 25 ft to 30 ft to form the tidal pass.

14. The method according to claim 13 wherein at least one apparatus designed to induce the formation of vertical oyster reefs includes a frame formed of rod members and including an inner frame and a radial outwardly spaced outer frame, the inner frame including an inner top frame portion and a vertically spaced inner bottom frame portion, the outer frame including an outer top frame portion and a vertically spaced outer bottom frame portion, a plurality of outer side support frame members extending between the outer top frame portion and the outer bottom frame portion, a plurality of inner side support frame members extending between the inner top frame portion and the inner bottom frame portion, and a plurality of cross ties extending between the inner frame and the outer frame; a plurality of individual mesh bags are positioned between the inner frame and the outer frame, wherein each individual mesh bag is aligned with at least one outer side support frame member and at least one inner side support frame member and wherein each individual mesh bag is coupled to an adjacent mesh bag; and cultch material fills each individual mesh bag.

15. A method of shoreline rehabilitation with induced oyster reef barrier and lagoon comprising the steps of:
installing at least two segments of contiguous vertical oyster inducing elements, wherein each segment is formed of contiguous line of a plurality of apparatus designed to induce the formation of vertical oyster reefs, wherein each segment is placed substantially the same distance from an original shoreline, wherein the distance from the original shoreline is at least 25 ft from the original shoreline, and wherein each segment extends at least 60 ft laterally along the shoreline
forming a tidal pass by placing each segment laterally spaced from an adjacent segment by a distance of 15 ft to 30 ft sufficient to form a tidal pass whereby the tidal pass and the two segments of contiguous vertical oyster inducing elements combine to stimulate the formation of a tidal lagoon associated with the tidal pass through the accumulation of shell at least partly shore side of each segment.

16. The method according to claim 15 wherein each segment is placed 75 feet from the original shoreline.

17. The method according to claim 16 wherein each segment of contiguous vertical oyster inducing elements includes a plurality of configurations of three triangular elements, wherein each triangular element within each configuration has one corner attached to a corner of another triangular element and a second corner attached to a corner of the remaining triangular element.

18. The method according to claim 17 wherein at least one apparatus designed to induce the formation of vertical oyster reefs includes a frame formed of rod members and including an inner frame and a radial outwardly spaced outer frame, the inner frame including an inner top frame portion and a vertically spaced inner bottom frame portion, the outer frame including an outer top frame portion and a vertically spaced outer bottom frame portion, a plurality of outer side support frame members extending between the outer top frame portion and the outer bottom frame portion, a plurality of inner side support frame members extending between the inner top frame portion and the inner bottom frame portion, and a plurality of cross ties extending between the inner frame and the outer frame; a plurality of individual mesh bags are positioned between the inner frame and the outer frame, wherein each individual mesh bag is aligned with at least one outer side support frame member and at least one inner side support frame member and wherein each individual mesh bag is coupled to an adjacent mesh bag; and cultch material fills each individual mesh bag.

* * * * *